United States Patent
Matsuo et al.

(10) Patent No.: US 7,187,155 B2
(45) Date of Patent: Mar. 6, 2007

(54) LEAKAGE INDUCTANCE SATURATION COMPENSATION FOR A SLIP CONTROL TECHNIQUE OF A MOTOR DRIVE

(75) Inventors: Takayoshi Matsuo, Brown Deer, WI (US); Jerry Thunes, Greenfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/846,315

(22) Filed: May 14, 2004

(65) Prior Publication Data

US 2005/0253550 A1    Nov. 17, 2005

(51) Int. Cl.
  *H02P 21/08* (2006.01)
  *H02P 23/08* (2006.01)
(52) U.S. Cl. ............ 318/807; 318/727; 318/798; 318/799; 318/801; 318/803; 318/806; 318/808; 318/804; 318/254
(58) Field of Classification Search ......... 318/727, 318/806, 807, 808, 809, 798, 799, 812, 766, 318/52, 705, 700, 713, 254
See application file for complete search history.

(56) References Cited

U.S. PATENT DOCUMENTS

| | | | | |
|---|---|---|---|---|
| 3,911,340 A | * | 10/1975 | Plunkett | 318/802 |
| 4,237,531 A | * | 12/1980 | Cutler et al. | 363/58 |
| 4,450,398 A | * | 5/1984 | Bose | 318/803 |
| 4,724,373 A | * | 2/1988 | Lipo | 318/805 |
| 4,967,134 A | * | 10/1990 | Losic et al. | 318/802 |
| 5,032,771 A | | 7/1991 | Kerkman et al. | |
| 5,140,248 A | * | 8/1992 | Rowan et al. | 318/811 |
| 5,334,923 A | * | 8/1994 | Lorenz et al. | 318/805 |
| 5,365,158 A | * | 11/1994 | Tanaka et al. | 318/806 |
| 5,440,219 A | * | 8/1995 | Wilkerson | 318/802 |
| 5,532,570 A | * | 7/1996 | Tajima et al. | 318/809 |
| 5,594,670 A | * | 1/1997 | Yamamoto | 702/64 |
| 5,598,081 A | * | 1/1997 | Okamura et al. | 318/801 |
| 5,644,206 A | * | 7/1997 | Yura | 318/807 |
| 5,729,113 A | * | 3/1998 | Jansen et al. | 318/799 |
| 5,811,956 A | * | 9/1998 | Yamamoto | 318/801 |
| 5,828,199 A | * | 10/1998 | Tajima et al. | 318/779 |
| 5,859,521 A | * | 1/1999 | Tajima et al. | 318/809 |
| 5,861,728 A | * | 1/1999 | Tazawa et al. | 318/778 |
| 5,880,572 A | * | 3/1999 | Tajima et al. | 318/800 |
| 5,923,144 A | * | 7/1999 | Seibel et al. | 318/805 |
| 6,014,006 A | * | 1/2000 | Stuntz et al. | 318/804 |
| 6,147,470 A | * | 11/2000 | Ohashi et al. | 318/757 |
| 6,166,514 A | * | 12/2000 | Ando et al. | 318/811 |

(Continued)

*Primary Examiner*—Rina Duda
*Assistant Examiner*—Elias Hiruy
(74) *Attorney, Agent, or Firm*—Quarles & Brady LLP; William R. Walbrun

(57) ABSTRACT

An electronic drive for vector control of an induction motor controls slip and operating frequency in response to changes in stator voltage. The drive includes a torque control loop, a flux control loop and a frequency control loop. The control is based on a commanded stator current that is resolved into a torque-producing, or q-axis, current component and a flux-producing, or d-axis, current component that are in quadrature. The frequency control loop includes slip control in which a slip frequency command is produces based on a value for the leakage inductance of the motor. The leakage inductance value dynamically varies as a function of the q-axis current reference command.

17 Claims, 2 Drawing Sheets

U.S. PATENT DOCUMENTS

| | | | |
|---|---|---|---|
| 6,316,904 B1 * | 11/2001 | Semenov et al. | 318/727 |
| 6,377,018 B2 * | 4/2002 | Tajima et al. | 318/727 |
| 6,636,012 B2 * | 10/2003 | Royak et al. | 318/727 |
| 6,784,634 B2 * | 8/2004 | Sweo | 318/727 |
| 6,809,492 B2 * | 10/2004 | Harakawa et al. | 318/609 |
| 6,864,660 B2 * | 3/2005 | Veltman | 318/801 |
| 2002/0141212 A1 * | 10/2002 | Ishida et al. | 363/98 |
| 2002/0149341 A1 * | 10/2002 | Tao | 318/798 |
| 2003/0062870 A1 * | 4/2003 | Royak et al. | 318/727 |
| 2004/0263111 A1 * | 12/2004 | Royak et al. | 318/798 |

* cited by examiner

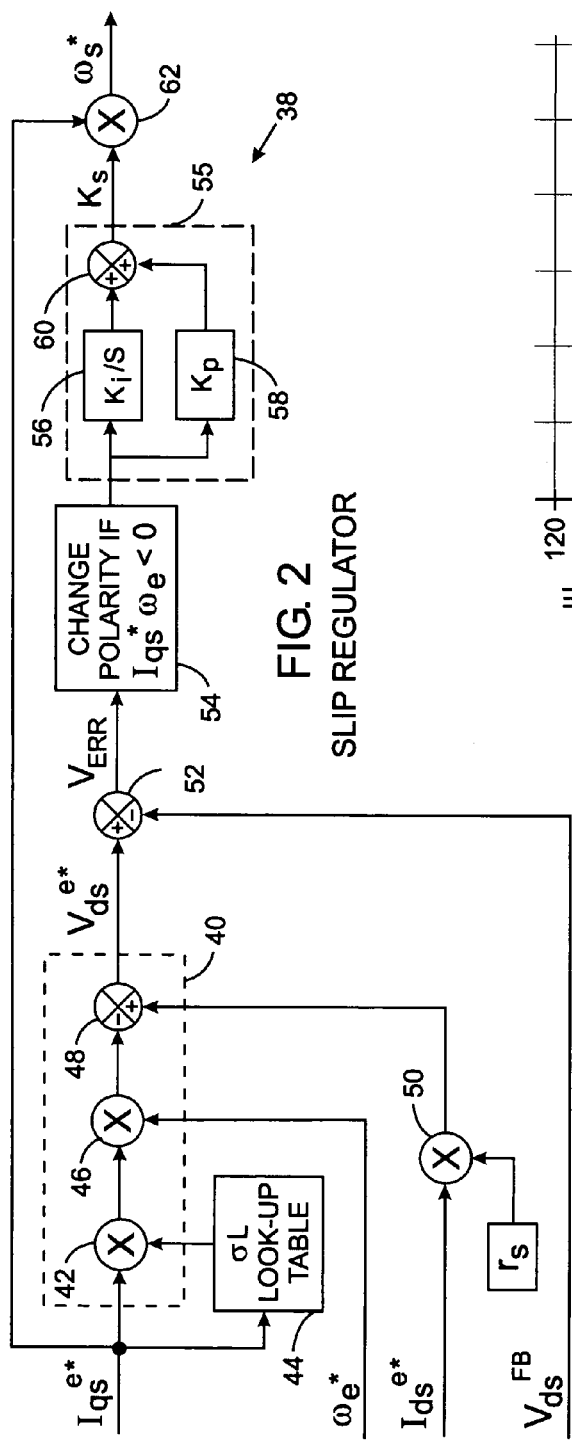
FIG. 2 SLIP REGULATOR
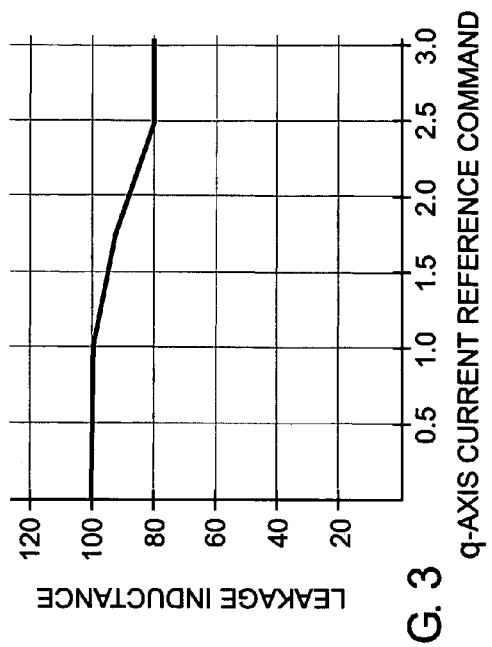
FIG. 3

LEAKAGE INDUCTANCE SATURATION COMPENSATION FOR A SLIP CONTROL TECHNIQUE OF A MOTOR DRIVE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to high performance, electronic motor drives for variable speed or torque control of AC induction motors, and more particularly, to such motor drives which use vector control techniques and velocity feedback.

2. Description of the Related Art

Motor drives are commonly employed to control the application of electricity to a three-phase AC induction motor. Such motor drives include an inverter which switches DC voltage to output lines in a pulse width modulated (PWM) manner to control the frequency and amount of voltage applied to the motor and thus the motor velocity.

Vector control or field-oriented control is one technique used in a motor drive to control the speed and torque of the motor. With this technique, stator current is resolved into a torque-producing, or q-axis, current component $I_{qs}$ and a flux-producing, or d-axis, current component $I_{ds}$, where the q-axis current component leads the d-axis component by a 90° phase angle. This type of motor drive also requires knowledge of several motor parameters, such as inductance and resistance of the rotor and stator coils.

For accurate control of a three-phase motor, besides controlling the stator current frequency, it is also necessary to effectively control the slip, which represents the difference between the frequency of the stator current and the electrical frequency of the rotor rotation speed. The slip control is a key component of the high performance motor control to establish an accurate torque control.

U.S. Pat. No. 5,032,771 describes a high performance motor drive which controls the torque, frequency and slip at which the motor operates. The drive includes a torque control loop, a flux control loop, and a frequency control loop that incorporates slip management in response to a voltage difference. The slip is controlled in response to an error between a d-axis reference voltage and a d-axis feedback voltage. Flux weakening is provided in response to an error between a q-axis reference voltage that is sensed when the motor is operating at the base speed and a q-axis feedback voltage that is sensed when the motor is operating above the base speed.

Accurate slip control requires precise information about leakage inductance of the motor. The prior motor drives controlled slip based on an assumed constant value for the leakage inductance. However, the leakage inductance varies due to saturation effects as the motor load increases. Therefore, accurate torque control becomes difficult over a wide torque range when a constant value for the leakage inductance is used for slip control.

Therefore, it is desirable to provide an improved motor control technique that addresses the effects resulting from variation of the leakage inductance.

SUMMARY OF THE INVENTION

A method for controlling slip in an induction motor that has a stator and a rotor, comprises determining voltage feedback that is representative of actual stator voltage and determining a rotor frequency which is related to the rotational speed of the rotor. A current command is generated in response to the rotor frequency, the voltage feedback, and a desired velocity command.

A leakage inductance value is derived as a function of the current command and thus varies with changes in that command. The leakage inductance value is employed to produce a slip frequency command which in turn is used along with the rotor frequency to determine stator operating frequency command. The actual current flowing through the stator is measured and the resultant measurement is employed to determine a current feedback. The voltage applied to the stator is controlled in response to the stator operating frequency command, the current command and the current feedback.

Therefore unlike previous motor drives, the present method adjusts the value of the leakage inductance which is used in deriving the voltage commands that control the motor.

BRIEF DESCRIPTION OF THE DRAWINGS

FIG. 2 is a detailed diagram of the slip regulator in FIG. 1; and

FIG. 3 is a graph depicting a relationship between the leakage inductance and the q-axis current reference command produced in the motor drive.

DETAILED DESCRIPTION OF THE INVENTION

Figure 1:
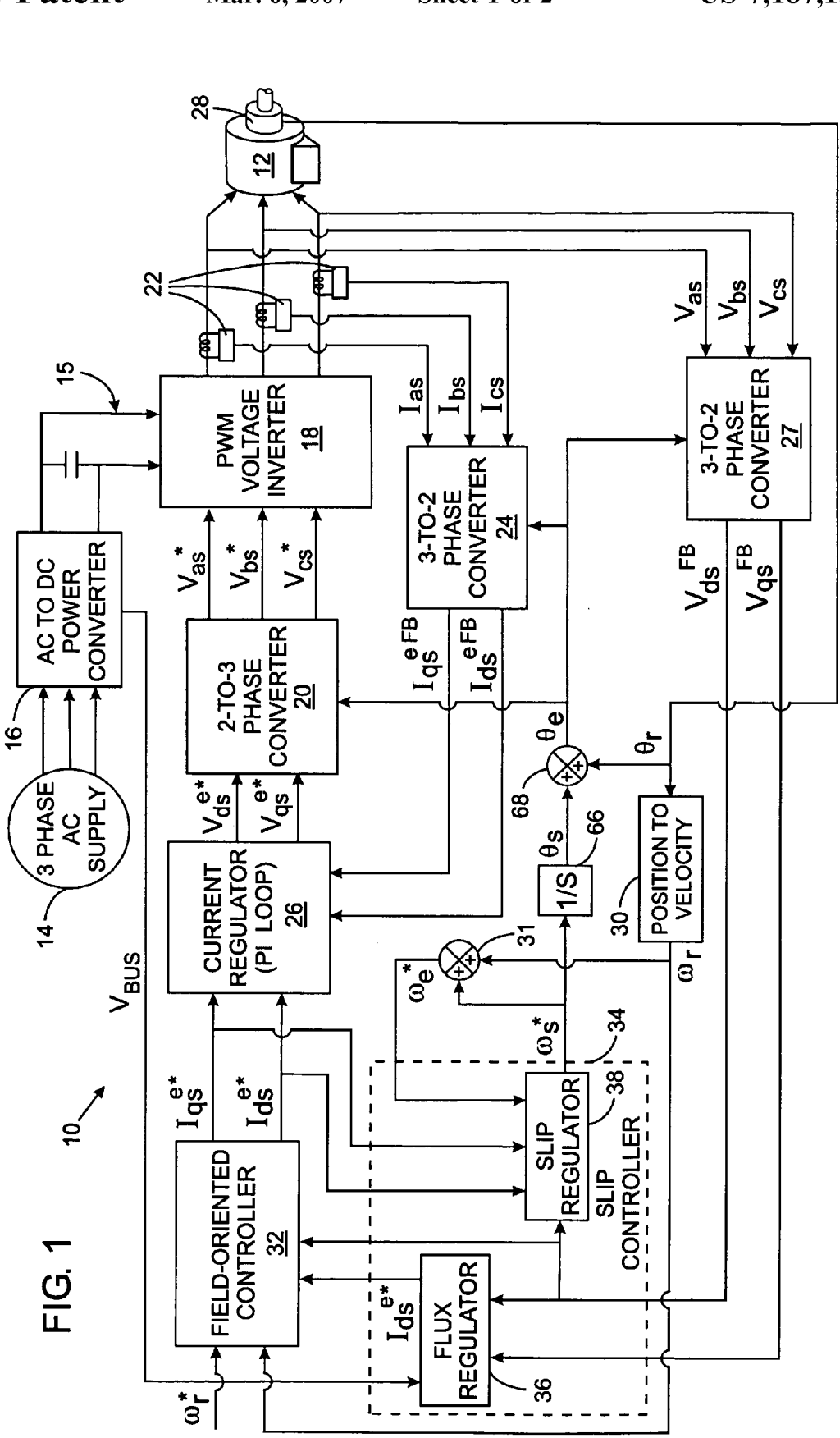
FIG. 1 is a schematic block diagram of a motor drive according to the present invention.

FIG. 1 illustrates a current-regulated, pulse width modulation motor controller, also called a "motor drive", 10 for an alternating current (AC) induction motor 12. The motor drive 10 includes a power section that receives electricity from a three-phase power supply 14. The three phases are connected to an alternating current (AC) to direct current (DC) power converter 16 that rectifies the alternating currents from the power supply 14 to produce a DC voltage on a bus 15. The DC bus 15 is connected to a pulse width modulation (PWM) voltage inverter 18, which completes the power section of the motor drive 10. The AC-DC power converter 16 also produces a feedback control signal $V_{BUS}$ that indicates the voltage level on the DC bus 15.

The conventional PWM voltage inverter 18 includes a group of solid state switching devices which are turned on and off by control signals to convert the input DC voltage to pulses of constant magnitude on three output lines connected to the motor 12. The pattern of pulses on each output line from the PWM voltage inverter 18 is characterized by a first set of positive-going pulses of equal magnitude but of varying pulse width, followed by a second set of negative-going pulses of equal magnitude and varying pulse width. The rms value of this voltage pulse pattern approximates one cycle of a sinusoidal AC waveform. The pattern is repeated to generate subsequent cycles of that waveform.

To control the frequency and magnitude of the resultant AC power signals, the PWM voltage inverter 18 receives three balanced control signals, $V_{as}^*$, $V_{bs}^*$ and $V_{cs}^*$ which vary in phase by 120°. The magnitude and frequency of these control signals respectively determine the widths and frequency of the pulses in the three power signals which are applied to the terminals of the motor 12.

As used throughout this description, an asterisk associated with a signal designation denotes a "command" signal and a designation without an asterisk denotes a signal applied to or derived from signals applied to the motor 12. An "s" subscript in a signal designation indicates that the associated signal is referred to the motor stator.

The AC inverter input control signals, $V_{as}^*$, $V_{bs}^*$ and $V_{cs}^*$ result from a phase conversion which is accomplished with a 2-to-3 phase converter 20, which includes a synchronous to stator converter at its inputs. The input signals $V_{qs}^{e*}$ and $V_{ds}^{e*}$ to that phase converter are synchronous voltage command signals of a given steady state magnitude. These signals are related to a stationary d-q reference frame in which torque-controlling electrical parameters are related to a q-axis and flux-controlling electrical parameters are related to a d-axis. The q-axis signal leads the d-axis signal by 90° in phase. The voltage commands $V_{qs}^{e*}$ and $V_{ds}^{e*}$ are produced by a synchronous current regulator 26 in response to measurements of the phase currents $I_{as}$, $I_{bs}$ and $I_{cs}$ flowing through the stator terminals on the motor 12, along with other input parameters, as will be described.

The motor phase currents $I_{as}$, $I_{bs}$ and $I_{cs}$ are measured by conventional current sensing devices 22. A first 3-to-2 phase converter 24, which also includes a stator to synchronous converter, transforms these phase current measurements into current feedback signals $I_{qs}^{eFB}$ and $I_{ds}^{eFB}$ related to the synchronous d-q frame of reference. The stator terminal voltages $V_{as}$, $V_{bs\ and\ Vcs}$ are applied to inputs of a second 3-to-2 phase converter 27 which transforms those phase voltages to feedback signals $V_{qs}^{FB}$ and $V_{ds}^{FB}$ which also are related to the synchronous d-q frame of reference. A conventional encoder 28 is attached to the shaft of the motor 12 and produces a signal indicating the angular position $\theta_r$ of that shaft. This encoder signal is applied to a position-to-velocity conversion circuit 30 which generates a digital rotor velocity signal $\omega_r$. That velocity signal $\omega_r$ is combined with an angular slip frequency command $\omega_s^*$ at first summation node 31 to produce a stator operating frequency command $\omega_e^*$ which is fed to the synchronous current regulator 26. Generation of the slip frequency command $\omega_s^*$ will be described hereinafter as part of the description of the slip controller 34.

The synchronous voltage commands $V_{qs}^{e*}$ and $V_{ds}^{e*}$ are produced by the synchronous current regulator 26 which includes a proportional-integral (PI) control loop with summing inputs. A q-axis current reference command $I_{qs}^{e*}$, received at one input, is algebraically summed with the current feedback signal $I_{qs}^{eFB}$ to provide a current error for the q-axis. A d-axis current reference command $I_{dse}^*$ at another input is algebraically summed with the $I_{ds}^{eFB}$ current feedback signal to provide a current error for the d-axis. The q-axis and d-axis current reference commands are collectively referred to herein as a current command. The synchronous current regulator 26 employs these input signals to produce the voltage reference commands $V_{qs}^{e*}$ and $V_{ds}^{e*}$ based on the current errors.

The d and q axis current reference commands $I_{ds}^{e*}$ and $I_{qs}^{e*}$ are supplied to synchronous current regulator 26 by a field-oriented controller 32 and a slip controller 34, both of which can be implemented by a commercially available microcontroller that operates in response to a stored program. The field-oriented controller 32 is described in detail in U.S. Pat. No. 5,032,771, the description of which is incorporated herein by reference. The motor drive 10 receives a desired velocity command $\omega_r^*$ as an input, which the field-oriented controller 32 employs in to furnishing digital values for the torque related q-axis current reference command $I_{qs}^{e*}$ and the flux related d-axis current reference command $I_{ds}^{e*}$ to the synchronous current regulator 26. The present invention can be used with other types of field-oriented controllers. Alternatively the motor drive may receive a desired torque command instead of the desired velocity command. The present invention can be used with other types of field-oriented controllers.

The slip controller 34 includes a flux regulator 36 which receives the motor voltage feedback signals $V_{qs}^{FB}$ and $V_{ds}^{FB}$ from the second 3-to-2 phase converter 27 and the feedback signal $V_{BUS}$ which indicates the voltage level on the DC bus 15. In response to those input signals, the flux regulator 36 generates the d-axis current reference command $I_{ds}^{e*}$ in the synchronous d-q frame of reference, as described in the U.S. patent mentioned immediately above. The d-axis current reference command is applied as an input to the field-oriented controller 32.

The slip controller 34 incorporates a novel slip regulator 38, the details of which are shown in FIG. 2. The slip regulator 38 receives the current reference commands $I_{qs}^{e*}$ and $I_{ds}^{e*}$. The q-axis current reference command $I_{qs}^{e*}$ is applied to function 40 which calculates the d-axis voltage command $V_{ds}^{e*}$ according to the equation:

$$V_{ds}^{e*} = (r_s I_{ds}^{e*}) - (\omega_e (\sigma L_s) I_{qs}^{e*}) \quad (1)$$

where $r_s$ is the stator resistance, $\omega_e^*$ is the stator operating frequency command, and $\sigma L_s$ is the leakage inductance. The leakage inductance in turn is defined by the expression:

$$\sigma L_s = L_s - \frac{L_m^2}{L_r} \quad (2)$$

where $L_s$ is the inductance of the stator, $L_m$ is the magnetizing inductance, and $L_r$ is the inductance of the rotor.

Computation of the d-axis voltage reference command $V_{ds}^{e*}$ commences at a first multiplier 42 where the q-axis current reference command $I_{qs}^{e*}$ is multiplied by the leakage inductance $\sigma L_s$. The leakage inductance is provided by a look-up table 44 based on the magnitude of that q-axis current reference command. As noted previously the leakage inductance varies due to saturation effects as the motor load increases. FIG. 3 graphically depicts the contents of the look-up table 44 and illustrates the relationship between the q-axis current reference command and the leakage inductance. This relationship is determined empirically for the specific motor 12 that is connected to the motor drive 10. This determination can be performed automatically by the motor drive during commissioning as described in U.S. Pat. No. 5,689,169. The data gathered during this process is stored in the memory of the motor drive as the look-up table 44. During operation of the motor thereafter the value of the q-axis current reference command $I_{qs}^{e*}$ addresses the storage location in the look-up table that contains the related value of the leakage inductance $\sigma L_s$. Therefore, unlike prior drives which used a constant value for the leakage inductance, the present slip regulator 38 uses a leakage inductance value $\sigma L_s$ that changes in correspondence with the actual variation of the leakage inductance of the motor.

The output produced by the first multiplier 42 is applied to one input of a second multiplier 46 which also received the stator operating frequency command $\omega_e^*$. The product from the second multiplier 46 is applied to an inverting input of a second summation node 48. The d-axis current reference command $I_{ds}^{e*}$ is multiplied by a constant value for the stator resistance $r_s$ by a third multiplier 50 and the product is applied to a non-inverting input of the second summation node 48. The stator resistance $r_s$ of the particular motor 12 is measured during the commissioning of the motor drive 10 and stored in the drive's memory. The second summation node 48 produces the d-axis voltage command $V_{ds}^{e*}$ from which the motor voltage feedback signal $V_{ds}^{FB}$ is subtracted at a third summation node 52 to generate a voltage error signal $V_{ERR}$.

Function block 54 changes the polarity of the voltage error signal $V_{ERR}$ if the product of the q-axis current reference command $I_{qs}^{e*}$ and the stator operating frequency command $\omega_e^*$ is a negative value. The resultant error value then is applied to a proportional-integral control loop 55 the comprises an integral branch 56 and a proportional branch 58 which produces a value for a slip gain $K_s$ according to the expression:

$$K_S = K_i \int [V_{ds}^{e*} - V_{ds}^*] + K_{PS}[V_{ds}^{e*} - V_{ds}^*] \quad (3)$$

The integral branch 56 provides the first term of that expression as designated by the integral function 1/S, where $K_i$ is a constant multiplication factor for the integral. In the proportional branch 58 the error value from function block 54 is multiplied by a proportional constant $K_{PS}$. The values produced by the two proportional-integral control branches 56 and 58 are summed at node 60 to produce the slip gain $K_s$ that then is multiplied by the q-axis current reference command $I_{qs}^{e*}$ in a third multiplier 62 to produce the slip frequency command $\omega_s^*$ at the output of the slip regulator 38 wherein:

$$\omega_s^* = K_s (I_{qs}^{e*}) \quad (4)$$

Referring again to FIG. 1, the slip frequency command $\omega_s^*$ is summed with the rotor frequency feedback $\omega_r$ at the first summation node 31 to generate the stator operating frequency command $\omega_e^*$. This value is fed back to slip regulator 38. Therefore, the current regulator 26 produces the voltage reference commands $V_{qs}^{e*}$ and $V_{ds}^{e*}$.

The slip frequency command $\omega_s^*$ also is integrated at operation 66 to obtain a desired angular slip position $\theta_s$ which is arithmetically summed with the rotor angular position $\theta_r$ to derive an angular position of the stator magnetomotive force $\theta_e$. The stator magnetomotive force position is used by the various phase converters 20, 24 and 27 of the motor drive 10.

The foregoing description was primarily directed to preferred embodiments of the present invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for controlling an induction motor having a stator and a rotor, the method comprising:
receiving a first command designating either a desired velocity or a desired torque for the induction motor;
sensing voltage existing at the induction motor;
sensing current existing at the induction motor;
determining a rotor frequency in response to rotational speed of the rotor;
generating a current command in response to the rotor frequency, the voltage existing at the induction motor, and the first command;
deriving a leakage inductance value which varies in response to performance of the induction motor;
producing a slip frequency command in response to the current command, the leakage inductance value, and the voltage that was sensed; and
controlling voltage applied to the motor in response to the slip frequency command, the current command, and the current existing at the induction motor.

2. The method as recited in claim 1 wherein sensing voltage comprises:
producing a first voltage feedback signal representative of a d-axis component of the voltage existing at the induction motor; and
producing a second voltage feedback signal representative of a q-axis component of the voltage existing at the induction motor.

3. The method as recited in claim 1 wherein generating a current command comprises:
producing a d-axis current reference command designating a d-axis component of a desired motor current; and
producing a q-axis current reference command representative of a q-axis component of the desired motor current.

4. The method as recited in claim 3 wherein deriving a leakage inductance value is in response to the q-axis component of the desired motor current.

5. The method as recited in claim 1 wherein deriving a leakage inductance value is in response to the current command.

6. The method as recited in claim 1 wherein producing a slip frequency command comprises:
determining a stator operating frequency command from the rotor frequency and the slip frequency command;
multiplying the leakage inductance value, a q-axis current reference command component of the current command and the stator operating frequency command to produce a first intermediate value;
multiplying a d-axis current reference command component of the current command by a stator resistance value to produce a second intermediate value;
deriving a first difference between the first and second intermediate values;
deriving a second difference between the first difference and a d-axis component of the voltage that was sensed to produce a voltage error;
determining a slip gain from the voltage error; and
multiplying the slip gain by the q-axis current reference command to produce the slip frequency command.

7. The method as recited in claim 6 wherein determining a slip gain comprises applying the voltage error to a proportional-integral control loop.

8. A method for controlling an induction motor having a stator and a rotor, the method comprising:
determining voltage feedback that is representative of stator voltage;
determining current feedback that is representative of stator current
determining a rotor frequency in response to rotational speed of the rotor;

generating a current command in response to the rotor frequency, the voltage feedback, and an input command designating either a desired velocity or a desired torque for the induction motor;

deriving a leakage inductance value in response to the current command;

producing a slip frequency command by:
(a) multiplying the leakage inductance value, a q-axis current reference command component of the current command, and the stator operating frequency command to produce a first intermediate value,
(b) multiplying a d-axis current reference command component of the current command by a stator resistance value to produce a second intermediate value,
(c) deriving a first difference between the first and second intermediate values,
(d) deriving a second difference between the first difference and a d-axis component of the voltage feedback to produce a voltage error,
(e) determining a slip gain from the voltage error, and
(f) multiplying the slip gain by the ci-axis current reference command to produce the slip frequency command; and controlling voltage applied to the stator in response to the slip frequency command, the current command, and the current feedback.

9. The method as recited in claim 8 wherein determining voltage feedback comprises:
producing a first voltage feedback signal denoting a d-axis component of the stator voltage; and
producing a second voltage feedback signal denoting a q-axis component of the stator voltage.

10. The method as recited in claim 8 wherein generating a current command comprises:
producing a d-axis current reference command designating a d-axis component of a desired stator current; and
producing a q-axis current reference command representative of a q-axis component of the desired stator current.

11. The method as recited in claim 10 wherein deriving a leakage inductance value employs the q-axis current reference command.

12. The method as recited in claim 8 further comprising determining a stator operating frequency command from the rotor frequency and the slip frequency command; and wherein controlling voltage applied to the stator is performed in response to the stator operating frequency command.

13. The method as recited in claim 8 wherein determining a slip gain comprises applying the voltage error to a proportional-integral control loop.

14. A method for controlling a three-phase induction motor having a stator and a rotor, the method comprising:
sensing three-phase stator voltage of the induction motor;
converting the three-phase stator voltage into a q-axis voltage feedback signal and a d-axis voltage feedback signal;
determining a rotor frequency in response to rotational speed of the rotor;
generating a q-axis current reference command and a d-axis current reference command in response to the rotor frequency, the q-axis voltage feedback signal, the d-axis voltage feedback signal, and an input command designating either a desired velocity or a desired torque for the induction motor;
deriving a leakage inductance value in response to the q-axis current reference command;
producing a slip frequency commanded by:
(a) multiplying the leakage inductance value, the q-axis current reference command and the stator operating frequency command to produce a first intermediate value,
(b) multiplying a d-axis current reference command by a stator resistance value to produce a second intermediate value,
(c) deriving a first difference between the first and second intermediate values,
(d) deriving a second difference between the first difference and a d-axis voltage feedback signal to produce a voltage error,
(e) determining a slip gain from the voltage error, and
(f) multiplying the slip gain by the q-axis current reference command to produce the slip frequency command;
determining a stator operating frequency command from the rotor frequency and the slip frequency command;
sensing three-phase current flowing through the induction motor; and
controlling voltage applied to the stator in response to the stator operating frequency command, the current command and the three-phase current.

15. The method as recited in claim 14 wherein deriving a leakage inductance value is in response to the q-axis current reference command.

16. The method as recited in claim 14 wherein determining a slip gain comprises applying the voltage error to a proportional-integral control loop.

17. The method as recited in claim 14 further comprising converting the three-phase current into a q-axis current feedback signal and a d-axis current feedback signal and wherein controlling voltage applied to the stator is in response to the q-axis and the d-axis current feedback signals.

* * * * *